United States Patent [19]

Mohajer

[11] Patent Number: 4,745,006

[45] Date of Patent: May 17, 1988

[54] METHOD FOR COATING NYLON-6 FOR IMPROVED THERMAL STABILITY

[75] Inventor: Yousef Mohajer, Midlothian, Va.

[73] Assignee: Allied Corporation, Morris Township, Morris County, N.J.

[21] Appl. No.: 102,190

[22] Filed: Sep. 29, 1987

Related U.S. Application Data

[63] Continuation-in-part of Ser. No. 946,724, Dec. 29, 1986, abandoned.

[51] Int. Cl.⁴ .............................................. B05D 7/00
[52] U.S. Cl. ............................... 427/222; 427/213.36; 427/307; 427/322
[58] Field of Search .................... 427/212, 213.36, 222, 427/307, 327

[56] References Cited

U.S. PATENT DOCUMENTS

| | | | |
|---|---|---|---|
| 2,705,227 | 3/1955 | Stamatoff | 427/384 X |
| 4,012,557 | 3/1977 | Cornelis | 428/397 X |
| 4,256,785 | 3/1981 | Dannelly | 427/422 |

Primary Examiner—Thurman K. Page

[57] ABSTRACT

In a process for the production of heat stabilized nylon-6, hot nylon pellets are directly sprayed with measured quantities of concentrated solutions of copper salts and inorganic halides. For soluble cupric salts, the pellets are sprayed with a first solution comprising the soluble cupric salt and a second solution comprising the halide. Separate solutions are utilized when necessary to avoid precipitation problems. For cuprous salts solubilized in concentrated halide solution, a single solution may be prepared for spraying. Rapid absorption of copper by nylon eliminates precipitation and subsequent loss of the chemicals or discoloration of products.

20 Claims, No Drawings

METHOD FOR COATING NYLON-6 FOR IMPROVED THERMAL STABILITY

This is a continuation-in-part of U.S. Pat. Ser. No. 946,724, filed Dec. 29, 1986 now abandoned.

BACKGROUND OF THE INVENTION

1. Field of the Invention

This invention relates to the heat stabilization of polyamides against degradation at elevated temperatures, and more particularly to an improved process for the production of heat stabilized polyamide material.

2. Description of Related Art

Tensile, impact and dielectric properties of nylon degrade with time. The effect proceeds more quickly at elevated temperatures. A general mechanism of thermo-oxidative degradation in nylon includes the initiation and propagation of free radicals which react with oxygen to form a peroxy radical. This, in turn, abstracts a hydrogen atom from another polymer molecule to form a hydroperoxide and a second polymer radical. Hydroperoxides are unstable and decompose into two or more radicals and the cycle repeats itself.

One approach to inhibit thermo-oxidative degradation is to utilize chain-breaking antioxidant compounds to chemically capture free radicals and deactivate them, thus breaking the chain reaction in the propagation stage.

It is well recognized that copper in combination with a halide imparts thermo-oxidative stability to nylon and inhibits such degradation of properties. Apparently, copper is reduced by a halide to a cuprous state. At this lower oxidation state, the copper acts as an antioxidant to trap free radicals and is oxidized back to the cupric state. Excess halide can then reduce the copper back to cuprous state.

U.S. Pat. No. 2,705,227 to Stamatoff, issued Mar. 29, 1955, discloses heat stabilization of polyamides by incorporating copper in dissolved form into the polyamide along with a stability enhancing halogen compound. The reference is particularly concerned with nylon-6,6 and suggests the addition of the stabilizer composition to condensing reactants at any time during the condensation, preferably to the polyamide salt prior to condensation.

However, such teachings of manner of addition of stabilizer compositions are not relevant to the nylon-6 process. Nylon-6 is produced by the polymerization of caprolactam. The caprolactam is heated in the presence of water and catalysts. Hydrolysis takes place, the ring opens, and polymerization occurs by an addition reaction. In a polycondensation step, linking of polymer chains to the appropriate molecular weight is effected by the removal of water. Molecular weight is controlled by use of chain terminators or the duration of the polymerization step. Under these conditions polymerization does not go to completion but to an equilibrium between monomer and polymer. At this stage and in molten form, the polymer-monomer mixture is discharged through multistrand dies and is pelletized or formed into chips. The monomer and low molecular weight fractions or oligomers are removed from the pellets by extraction or leaching with hot water, after which step the pellets are dried. During this leaching step, a noticeable quantity of copper and a major proportion of the halogen compounds would be lost if they were added prior to extraction. The preferred halides such as KI, NaI, and NaBr, are highly water soluble and thus prone to loss during extraction.

Impregnation of the desired additives to the leached chips has become an acceptable method of introducing the stabilizer compounds. Copper, iodide, bromide and other additives such as magnesium can be impregnated from an aqueous solution. For impregnation the pellets are introduced into a vessel where they reside for a time, typically a few hours, while impregnation fluid is circulated through the vessel. There are major problems resulting from an impregnation process however. Formation of precipitates is inevitable due to presence of reactive components. The formation of precipitates results in clogging-up solution filters. For example, $Cu(OH)_2$, CuIOH, $Cu(OH)(CH_3COO)$ and other insoluble salts could be formed depending on temperature, pH and concentration. The precipitates also affect the color of the chips in an undesirable manner and reduce the efficiency of the process apparently due to loss of additives. The process is difficult to control, requiring one to three days to reach steady state after the beginning of the impregnation. Continuous monitoring and control of numerous variables are essential, with unexpected upsets the rule rather than the exception.

The method of the present invention addresses these shortcomings in an efficient, simple manner and produces product with acceptable properties.

SUMMARY OF THE INVENTION

In a process for the production of heat stabilized nylon-6, following extraction of monomers and oligomers, the hot nylon pellets are directly sprayed with measured quantities of concentrated solutions of copper salts and inorganic halides. For soluble cupric salts, the hot nylon-6 pellets are directly sprayed with measured quantities of concentrated solutions of individual chemical components. A first solution contains a soluble cupric salt. A second solution contains an alkali metal halide or an alkaline earth metal halide. Each chemical solution is prepared separately at a selected concentration. The solutions are sprayed, simultaneously or sequentially, onto the hot leached pellets preferably using separate nozzles in such a manner that the solutions do not mix for any substantial period before they wet the pellets. Less soluble cuprous salts can be solubilized in a single concentrated halide solution for spraying onto the hot pellets. The pellets are preferably tumbled for a short period, for example up to five minutes, to achieve a uniform distribution of chemicals and then dried. Rapid absorption of copper by nylon eliminates precipitation and subsequent loss of the chemicals or discoloration of products. The method provides nearly 100% efficiency for absorption of desired chemicals. The physical properties of nylon fiber produced by this method have been found to be equal or better than those prepared by the usual method involving impregnation from solution. The ease of operation and control of the process of this invention provide important cost advantages in a commercial process.

DESCRIPTION OF THE PREFERRED EMBODIMENT

The invention relates to an improved process for incorporating inorganic heat stabilizer compositions into nylon-6 polymer. The role of copper and halide salts in imparting thermo-oxidating stability to nylon is discussed above.

Copper salts can include cuprous salts and cupric salts. Halide salts can include alkali metal halide or alkaline earth metal halides including iodides, chlorides, bromides and fluorides. In preparing concentrated solutions for the process of this invention, however, it is important to determine whether there will be resulting precipitates which may affect the color of the chips or the concentration of the solution. If precipitates present a problem, resulting from the copper salts and inorganic halide selected, the process can be conducted in the following manner.

A first solution of a soluble cupric salt is prepared. Any soluble cupric salt may be considered, with copper chloride, copper bromide and copper acetate preferred examples. The concentration of the solution can range from a saturated solution down to about 1 weight percent copper salt.

A second solution is prepared of an alkali metal halide or an alkaline earth metal halide including iodides, chlorides, bromides and fluorides. Chlorides, iodides and bromides are preferred. The concentration of this solution can range from a saturated solution down to 1 weight percent halide, a concentration of 10-25 weight percent being economically feasible.

If the above solutions are sprayed individually on the hot leached nylon pellets, the copper will be absorbed by the nylon pellets very fast, almost instantaneously. The rapid elimination of copper from aqueous solution reduces or eliminates the side reactions which are responsible for formation of precipitates which can produce color problems in the polymer when spun into yarn. For a given solution concentration and a given quantity of polymer, a measured amount of solution is sprayed to provide a copper concentration of 10-500 parts per million (ppm) preferably 20-80 ppm based on the weight of the polymer. A sufficient amount of the halide solution is sprayed on to the polymer to achieve 0.01 to 0.5, preferably 0.03 to 0.3 weight percent halide, based on polymer weight. The additives are incorporated into the nylon pellets in one minute or less at 100° C., when adding about 40 ppm copper and about 0.12 weight percent KI, based on weight of the polymer. The rate of absorption of copper and halide depends on the concentration and the temperature. Since there is almost 100 percent efficiency of additive pickup in the process of the invention, it is a simple matter of control to select the desired concentration of the solutions and amount to be added to the polymer.

For cupric salts it is preferred that the two solutions be maintained separately to reduce potential for side reactions, then sprayed individually onto the polymer either simultaneously or sequentially. However the two solutions may be combined for a short period that will not be sufficient for such side reactions to occur, then sprayed through a single nozzle. Such combination is considered to be within the scope of the claimed invention.

It has been found experimentally that spraying the cupric solution first results in reduced color over spraying the halide solution first. However no difference in thermal properties due to the other of spraying have been found. Thus, while it is preferred to spray the cupric solution onto the pellets first, the scope of the invention is intended to cover either sequential order or simultaneous application.

There are instances wherein cupric and halide salts may form stable solutions, for example a solution of cupric acetate and potassium bromide, where no problems from precipitation results. In such instances a single solution may be prepared and sprayed.

Cuprous salts are generally less soluble in water than cupric salts. However, cuprous salts can be solubilized in a concentrated halide solution. Thus a single solution of cuprous salt and of halide salt can be prepared for spraying onto the hot nylon-6 pellets. Any cuprous salt may be considered, for example cuprous iodide, chloride, or bromide, provided that it has sufficient solubility in the concentrated halide solution. As for the cupric salt, for a given solution concentration and a given quantity of polymer, a measured amount of solution is sprayed to provide a copper concentration of 10-500 ppm, preferably 20-80 ppm based on the weight of the polymer. A sufficient amount of halide is included to achieve 0.01 to 0.5, preferably 0.03 to 0.3 weight percent halide, based on polymer weight.

The selected amount of additives are coated, for example by spraying, onto a known amount of nylon pellets. The pellets are at a temperature sufficient to promote fast absorption of copper, preferably at least 60° C., more preferably 70° to 110° C. The pellets preferably are then immediately agitated, for example by tumbling, to insure even distribution. After a short time, from one to five minutes after spraying, the additives are substantially absorbed into the pellets and the pellets can be introduced to the drier.

The pellets and yarn produced by this process are significantly whiter than that produced by impregnation and the color variation is reduced substantially. There is an improvement in the viscosity of the polymer during spinning. The thermal stability of yarn produced from the sprayed polymer is at least equal or better than that of a yarn produced from impregnated chips of similar composition.

In the event that separate solutions are prepared to avoid the side reactions discussed above, it is preferred that the individual chemical solutions be sprayed from separate nozzles onto the hot pellets. Then with the rate of absorption adequately fast, the pellets will absorb the additives before the chemicals have the opportunity to adversely react with each other. It is important to have the pellets at a sufficiently elevated temperature to insure an adequately fast rate of absorption. Leached pellets immediately following extraction of monomers and oligomers with hot water are at temperatures in excess of 80° C. which insure such fast rate of absorption. By spraying is meant that the additives are relatively evenly distributed over the polymer chips, with additional agitation or tumbling preferred to achieve an even distribution. The swiftness of the process is such that the sprayed pellets within one to five minutes have absorbed a substantial portion of the additives and can then be subjected to drying.

EXAMPLE 1

Laboratory trials were conducted without actual use of a spray nozzle. The spraying of chips was simulated by the following coating procedure: a kilogram of unimpregnated leached nylon-6 pellets was placed in a two-liter jar containing one liter of ionized water at 80°-90° C. The jar was placed in a shaking water bath at 85° C. for three to five hours. This was done to raise the temperature of the pellets and also to increase their water content thus bringing them to conditions as close as those imposed on pellets leaving the plant leacher in a commercial process. Iodide, magnesium, and copper salts were each dissolved separately in 20 ml of distilled water. Excess hot water was decanted from the pellets. The hot pellets were poured into a 3-liter round bottom flask as fast as possible. A measured quantity of the iodide and copper solutions (and magnesium if indicated) was then dumped into the flask and immediately the content was shaken for one minute to bring a homogenous distribution of ingredients. The flask was then placed in the hot water bath and shaken more gently for an additional nine minutes. The flask was then placed on a rotary evaporator and dried for one-half hour at 80°-90° C. using water aspirator followed by an additional one-half hour drying using a vacuum pump. The pellets were subjected to conventional drying until the moisture content was below 0.1 percent, then spun into fiber in a conventional manner. The products were analyzed after drying the pellets and also after spinning the yarn. The average efficiency of element pickup was 96 percent for Cu in free fall yarn samples, 91 percent for I and 98 percent for Mg in the pellets. This is an improvement over the efficiency obtained by the impregnation which has been reported to be 25 percent for Cu, 90 percent for Mg and 80 percent for halogen according to earlier work.

EXAMPLE 2

The rate of absorption of copper and iodine were measured by applying the desired solutions onto the pellets at a given temperature. After sufficient agitation to produce uniform coating of the additive solutions onto the pellets, they were removed at predetermined times from the spray chamber. The pellets were padded with napkins to remove the surface solutions and then analyzed to obtain the percent gain of additives with time. The targeted level was 0.12 weight percent for KI and 40 ppm for Cu. The absorption of copper is tremendously rapid, reaching full absorption in about six minutes at 80° C. The rate of absorption of I is noticeably lower than that of Cu. However, with a considerable excess of I applied (mole I/mole Cu=12) more than four moles of iodide is incorporated in less than one minute for each mole of copper. Recent experience has shown that this is more than adequate to impart needed thermal properties to polymer. Moreover any excess additive will eventually be incorporated in the melt during the spinning process.

The influence of temperature on the diffusion rate of iodide and Cu was studied. With an increase in the temperature, the rate of permeation for both species is increased. At 100° C., all the copper and over 50 percent of the iodide was permanently lodged in the nylon pellets in less than one minute. Indeed, this finding pointed to the fact that the spray application of additives could be carried out in the plant during conveying of the hot polymer from the leacher into the dryer; the residence time in the conveyor being about one minute or less.

EXAMPLE 3

Sample nylon-6 pellets were prepared in accordance with the procedure of Example 1 above. These sprayed samples are samples 1-6 in Table 1 below. Samples 7-9 are nylon-6 pellets in which the copper and halide have been introduced by impregnation. The control is nylon-6 with no stabilizer added. The sample pellets were melt spun in a consistent, conventional manner, with physical properties of the spun fiber given in Table 2.

The mechanical properties of all of the yarns are acceptable, as spun. Even sample 10 with no additive and sample 9 with major negative ΔFAV (discussed below) produced reasonably strong yarns.

The stability of yarns were monitored by measuring the percent breaking strength retention, percent BSR, at 177° C. in air and under constant length. The accelerated aging test readily differentiates the performance of a yarn in an oxidative environment. Since the results are qualitative, each yarn is therefore tested after subjecting it to various storage times, from 4 to 72 hours. A comparison of yarn is shown in Table 1.

In the absence of any additive (Sample 10), nylon-6 degrades very readily. After only four hours of treatment, over 80 percent of the strength is lost, and after 24 hours the yarn cannot even be peeled off the sleeve. Inorganic additives improve the performance significantly. Comparing the behavior of sprayed (Samples 1-6) versus the impregnated (Samples 7-9) samples, it is realized that the performance of the sprayed samples is at least equal to and in some cases even better than that of impregnated yarns.

The impregnated nylon-6 polymer generally exhibits reduction of molecular weight during spinning. The reduction of molecular weight is monitored by comparison of solution viscosity of a free fall sample versus the original pellets. The free fall sample is spun fiber obtained directly from the spinnerette.

The formic acid viscosity of the free fall sample is usually lower than that of the pellets, thus the change in formic acid viscosity (ΔFAV) is usually negative. Generally, a ΔFAV of −3 to −5 has been observed for impregnated polymer during plant spinning. The loss of molecular weight is believed to be associated with excess acetate picked up by chips from the impregnation solution where magnesium acetate and acetic acid are present in considerable concentrations. Since no excess acetate is used for spray application, then the polymer produced by this method should not exhibit negative ΔFAV. This indeed has generally been observed; even under experimental conditions where moisture pickup during spinning is not well controlled. Whereas impregnated plant samples exhibit a large negative ΔFAV, the sprayed samples show positive or a small negative ΔFAV. This increase in molecular weight, if controlled, should be beneficial for performance of yarn. Results of ΔFAV measurements are given in Table 3.

TABLE 1

PERCENT BREAKING STRENGTH RETENTION AT CONSTANT LENGTH AND 177° C.

| Sample | Copper ppm | Copper Form | Weight % KI | Hours 4 | 24 | 48 | 72 |
|---|---|---|---|---|---|---|---|
| 1 | 40 | Acetate | 0.12 | 89.0 | 57.8 | 43.5 | 40.3 |
| 2 | 50 | Acetate | 0.12 | 99.3 | 71.3 | 48.3 | 37.1 |
| 3 | 50 | Chloride | 0.12 | 92.8 | 62.5 | 42.8 | 42.1 |
| 4 | 50 | Chloride | 0.24 | 96.1 | 76.0 | 55.2 | 44.8 |
| 5 | 50 | Bromide | (0.12% KBr) | 83.4 | 47.7 | 40.4 | 31.3 |
| 6 | 50 | Chloride | (0.04% KI) (0.04% KBr) (0.04% KCl) | 91.1 | 59.9 | 39.5 | 29.9 |
| 7 | 44 | Chloride | 0.24 | 100.7 | 75.9 | 52.5 | 39.0 |
| 8 | 7 | Acetate | 0.11 | 83.8 | 74.3 | 44.3 | 38.3 |
| 9 | 40 | Acetate | 0.13 | 89.0 | 58.2 | 44.5 | 41.8 |
| 10 | 0 | — | 0 | 17.6 | 0 | 0 | 0 |

TABLE 2

PHYSICAL PROPERTIES OF FIBERS

| Sample ID | Draw Ratio | dTex | Breaking Str. (N) | Elong. % | Tenacity mN/dtex | Modulus mN/dtex |
|---|---|---|---|---|---|---|
| 1 | 4.62 | 969 | 67.6 | 15.2 | 69.8 | 348.5 |
| 2 | 4.70 | 961 | 63.6 | 13.8 | 66.2 | 362.9 |
| 3 | 4.73 | 963 | 67.6 | 14.8 | 70.2 | 408.4 |
| 4 | 4.54 | 1029 | 68.5 | 16.0 | 66.6 | 360.7 |
| 5 | 4.60 | 994 | 67.2 | 15.2 | 67.6 | 304.3 |
| 6 | 4.53 | 1011 | 69.8 | 15.6 | 69.0 | 310.3 |
| 7 | 4.39 | 1017 | 71.6 | 16.0 | 70.4 | 285.6 |
| 8 | 5.00 | 913 | 81.4 | 12.8 | 89.2 | 514.6 |
| 9 | 5.07 | 922 | 64.9 | 14.2 | 70.4 | 366.2 |
| 10 | 5.14 | 882 | 69.4 | 12.8 | 78.7 | 394.8 |

TABLE 3

CHANGE IN VISCOSITY OF POLYMER DURING SPINNING

| Sample | Moisture Content of Pellets, % | Formic Acid Viscosity Pellets | Free Fall | ΔFAV |
|---|---|---|---|---|
| 1 | 0.082 | 92.2 | 90.4 | −1.8 |
| 2 | 0.087 | 93.9 | 95.0 | +1.1 |
| 3 | 0.062 | 92.4 | 94.5 | +2.1 |
| 4 | 0.060 | 91.7 | 97.3 | +5.6 |
| 5 | 0.048 | 90.3 | 90.1 | −0.2 |
| 6 | 0.064 | 95.6 | 98.9 | +3.3 |
| 7 | 0.024 | 101.3 | 101.4 | +0.1 |
| 8 | 0.020 | 87.9 | 78.9 | −9.0 |
| 9 | 0.020 | 98.3 | 70.9 | −27.4 |
| 10 | 0.090 | 90.0 | 69.5 | −30.5 |

EXAMPLE 4

Solubility of cuprous iodide in water at room temperature is very low (0.42 mg/l). Cuprous iodide is, however, very soluble in sodium iodide solution. In this example a homogeneous solution was made by placing 2.95 g of solid CuI in 44 g of 57% sodium iodide solution. In less than 5 minutes the solids were all dissolved. To 1000 g of leached hot chips, as described in Example 1 was added 2.05 g of this solution followed by vigorous shaking. The chips were dried and spun as described before. The concentraction of cooper was around 40 ppm and iodide around 1000 ppm as anticipated. The thermal properties of the yarn produced by this treatment were similar to sample 1–9 in Table 1.

What is claimed:

1. A process for production of heat stabilized nylon-6 polymer comprising:
   polymerizing caprolactam to form a polymer-monomer mixture containing low molecular weight fractions;
   pelletizing said polymer-monomer mixture to form pellets;
   leaching said monomer and low molecular weight fractions from said pellets with hot water, thereby elevating the temperature of said pellets and resulting in pellets formed substantially of nylon-6 polymer;
   and coating said leached nylon-6 polymer pellets, while still warm from said leaching step, with measured quantities of copper salt and halide salt in solution, said measured quantities of copper salt and halide salt comprising an amount of copper sufficient to provide to the polymer 10–500 parts per million copper based on the weight of the polymer and 0.01 to 0.5 weight percent halide, based on the weight of the polymer, sufficient time being provided to permit substantial absorption of the copper and halide into the nylon-6 polymer pellet.

2. The process of claim 1 wherein said halide salt is selected from the group consisting of alkali metal halides and alkaline earth metal halides, and said halide is selected from the group consisting of chloride, iodide and bromide.

3. The process of claim 2 wherein said leached nylon-6 polymer pellets are at a temperature of at least 60° C. for said coating step.

4. The process of claim 3 wherein said copper salt is a cuprous salt selected from the group consisting of cuprous iodide, cuprous bromide, and cuprous chloride.

5. The process of claim 3 wherein said copper salt is a soluble cupric salt, and said coating step comprises coating said nylon-6 polymer pellets with a first solution of said soluble cupric salt and a second solution of said halide salt.

6. The process of claim 5 wherein the soluble cupric salt is selected from the group consisting of copper acetate, copper chloride and copper bromide; and the halide salt is selected from the group consisting of potassium iodide, sodium iodide and sodium bromide.

7. The process of claim 6 wherein said nylon-6 polymer pellets are at a temperature of 70° to 110° C. for said coating step.

8. The process of claim 5 wherein said coating step comprises spraying said first solution from first spray means and spraying said second solution from second spray means.

9. The process of claim 6 wherein said coating step comprises spraying said first solution from first spray means and spraying said second solution from second spray means.

10. A process for production of heat stabilized nylon-6 polymer comprising coating nylon-6 polymer pellets with measured quantities of a copper salt and a halide salt in solution, said measured quantities of copper salt and halide salt comprising an amount of copper sufficient to provide to the polymer 10–500 parts per million copper based on the weight of the polymer and 0.01 to 0.5 weight percent halide, based on the weight of the polymer; said polymer pellets being at a sufficient temperature and there being sufficient time provided to permit substantial absorption of the copper and halide into the nylon-6 polymer pellets.

11. The process of claim 10 wherein said halide salt is selected from the group consisting of alkali metal halides and alkaline earth metal halides, and said halide is selected from the group consisting of chloride, iodide and bromide.

12. The process of claim 11 wherein said nylon-6 polymer pellets are at a temperature of at least 60° C.

13. The process of claim 12 wherein said copper salt is a cuprous salt selected from the group consisting of cuprous iodide, cuprous bromide, and cuprous chloride.

14. The process of claim 13 wherein said coating step comprises spraying said solution onto said polymer pellets.

15. The process of claim 12 wherein said copper salt is a soluble cupric salt.

16. The process of claim 15 wherein said coating step comprises coating said nylon-6 polymer pellets with a first solution of said soluble cupric salt and a second solution of said halide salt.

17. The process of claim 16 wherein the soluble cupric salt is selected from the group consisting of copper acetate, copper chloride and copper bromide; and the halide salt is selected from the group consisting of potassium iodide, sodium iodide and sodium bromide.

18. The process of claim 17 wherein said nylon-6 polymer pellets are at a temperature of 70° to 110° C. for said coating step.

19. The process of claim 16 wherein said coating step comprises spraying said first solution from first spray means and spraying said second solution from second spray means.

20. The process of claim 17 wherein said coating step comprises spraying said first solution from first spray means and spraying said second solution from second spray means.

* * * * *